US009182081B2

(12) United States Patent
Ziegel et al.

(10) Patent No.: US 9,182,081 B2
(45) Date of Patent: Nov. 10, 2015

(54) RAPID DATA-BASED DATA ADEQUACY PROCEDURE FOR PIPELINE INTEGRITY ASSESSMENT

(75) Inventors: Eric R. Ziegel, Houston, TX (US); Richard S. Bailey, Ashtead (GB); Kip P. Sprague, Anchorage, AK (US)

(73) Assignees: BP Corporation North America Inc., Houston, TX (US); BP Exploration Operating Company Limited (GB)

( * ) Notice: Subject to any disclaimer, the term of this patent is extended or adjusted under 35 U.S.C. 154(b) by 690 days.

(21) Appl. No.: 12/164,971

(22) Filed: Jun. 30, 2008

(65) Prior Publication Data

US 2009/0326865 A1 Dec. 31, 2009

(51) Int. Cl.
*G06F 17/18* (2006.01)
*F17D 5/00* (2006.01)

(52) U.S. Cl.
CPC .................................... *F17D 5/00* (2013.01)

(58) Field of Classification Search
CPC .................................................... F17D 5/00
USPC .................................................... 702/179
See application file for complete search history.

(56) References Cited

U.S. PATENT DOCUMENTS

| | | | | |
|---|---|---|---|---|
| 4,344,142 | A * | 8/1982 | Diehr et al. | 700/198 |
| 4,935,195 | A | 6/1990 | Palusamy et al. | |
| 4,998,208 | A | 3/1991 | Buhrow et al. | |
| 5,072,388 | A | 12/1991 | O'Sullivan et al. | |
| 5,635,645 | A | 6/1997 | Ottes et al. | |
| 5,965,818 | A | 10/1999 | Wang | |
| 6,487,518 | B1 | 11/2002 | Miyazaki et al. | |
| 6,556,924 | B1 | 4/2003 | Kariyawasam et al. | |
| 6,651,012 | B1 * | 11/2003 | Bechhoefer | 702/34 |
| 6,813,949 | B2 | 11/2004 | Masaniello et al. | |

(Continued)

FOREIGN PATENT DOCUMENTS

| | | | |
|---|---|---|---|
| BY | 6795 | C1 | 3/2005 |
| CA | 2435626 | A1 | 1/2005 |

(Continued)

OTHER PUBLICATIONS

Caleyo et al, "A reliability-based approacch for the condition assessment of corroding pipelines," (2003).*

(Continued)

*Primary Examiner* — Hyun Park
(74) *Attorney, Agent, or Firm* — John Poliak

(57) ABSTRACT

A method and system for evaluating the sample coverage of ultrasonic or radiography (UT/RT) measurements of pipeline wall thickness for statistical validity. A data library contains distributions of in-line inspection (ILI) measurements for other pipelines, calibrated to correspond to UT/RT measurements as needed. The data library for these ILI-measured pipelines also includes statistics generated from Monte Carlo simulation, by way of which various sample coverage levels sample the ILI measurements, for determining whether a measurement exceeds a given threshold or meets another premise related to determining the extreme wall loss measurement for the pipeline. A pipeline with sampled UT/RT measurements is used to identify one or more ILI-measured pipeline datasets that are most similar, and the statistics from those most similar pipeline datasets determine whether the sample coverage of the UT/RT measurements is sufficient to draw conclusions about the extreme value of wall loss in the sampled pipeline.

26 Claims, 5 Drawing Sheets

(56) References Cited

U.S. PATENT DOCUMENTS

| | | | | |
|---|---|---|---|---|
| 7,013,249 | B1 | 3/2006 | Davis | |
| 7,035,777 | B2 | 4/2006 | Araki et al. | |
| 7,263,887 | B2 | 9/2007 | Sfeir et al. | |
| 2001/0032064 | A1 * | 10/2001 | Araki et al. | 703/6 |
| 2005/0149305 | A1 | 7/2005 | Araki et al. | |
| 2006/0229855 | A1 | 10/2006 | Araki et al. | |
| 2006/0283251 | A1 | 12/2006 | Hunaidi et al. | |
| 2006/0288756 | A1 | 12/2006 | De Meurechy | |

FOREIGN PATENT DOCUMENTS

| | | | |
|---|---|---|---|
| CN | 101071098 | A | 11/2007 |
| RU | 27708 | U1 | 2/2003 |
| WO | 2004/005915 | A2 | 1/2004 |
| WO | 2008/016697 | A2 | 2/2008 |

OTHER PUBLICATIONS

TWI Limited, "Guidelines for use of statistics for analysis of sample inspection of corrosion," (2002).*
Gobin, CA 2,435,626 English translated version).*
Hallen et al., "Statistical Calibration of pipeline in-line inspection data," (WCNDT-conference—2004).*
Supreme Court Decision (Alice vs CLS Bank) (2013).*
Vose, Risk Analysis, 2d. ed., (Wiley, 2000), Chapter 4.
Eurasian Patent Search Report mailed on May 11, 2011, in related Eurasian application No. 201100121, and English translation thereof, 3 pages.
English translation of RU 27708 U1, Russian Federation, Federal Service for Intellectual Property, Patent and Trademarks, Publication Date: Feb. 10, 2003, 30 pages.
English translation of BY 6795 C1, Republic of Belarus, National Center of Intellectual Property, Publication Date: Mar. 30, 2005, 9 pages.
PCT International Search Report and the Written Opinion of the International Searching Authority or the Declaration, issued for International application No. PCT/US2009/048441, mailed Sep. 14, 2012, 16 pages.
Bailey et al.: "Enough is Enough: Data Sufficiency", SPE 128697, Intelligent Energy Conference and Exhibition, Mar. 23-25, 2010, pp. 1-12, XP008151298, Utrecht, NL.
Khalifa M. et al.: "A Methodology for Calculating Sample Size to Assess Localized Corrosion of Process Components", Journal of Loss Prevention in the Process Industries, vol. 325, No. 1, Jan. 2012, pp. 70-80, XP028392412, St John's, Canada.
Ziegel et al.: "Using Data Mining to Build a Tool to Estimate the Extent of Pipeline Corrosion", SPE 144181, Digital Energy Conference and Exhibition 2011, Apr. 19-21, 2011, pp. 1-11, XP0088151295, The Woodlands, Texas, USA.
Khan et al.: "Statistical Approach to Inspection Planning and Integrity Assessment", Insight, vol. 49, No. 1, Jan. 2007, pp. 26-36,St John's, Canada.
Alfonso L. et al.: "Application of Extreme Value Statistics to the Prediction of Maximum Pit Depth in Non-piggable, Buried Pipelines", Proceedings of the 7th ASME International Pipeline Conference 2008, IPC200864351,vol. 4, Sep. 29, 2008, to Oct. 3, 2008, pp. 389-397, XP008155380, Calgary, Alberta, Canada.
Najjar D. et al.: "A New Approach to Predict the Pit Depth Extreme Value of a Localized Corrosion Process", ISIJ International, vol. 43, No. 5, 2003, pp. 720-725, XP008155404, Lille cedex, France.
Meeker W. Q. et al.: "Statistical Methods for Reliability Data", 1998, John Wiley & Sons, XP002682538, pp. 231-253 and pp. vii-xiii, section 10.1.2.
Kowaka M.: "Introduction to Life Prediction of Industrial Plant Materials: Application for the Extreme Value Statistical Method for Corrosion Analysis", 1994, Allerton Press, XP002682537, pp. vii-x, 19-45, section 3.3.

* cited by examiner

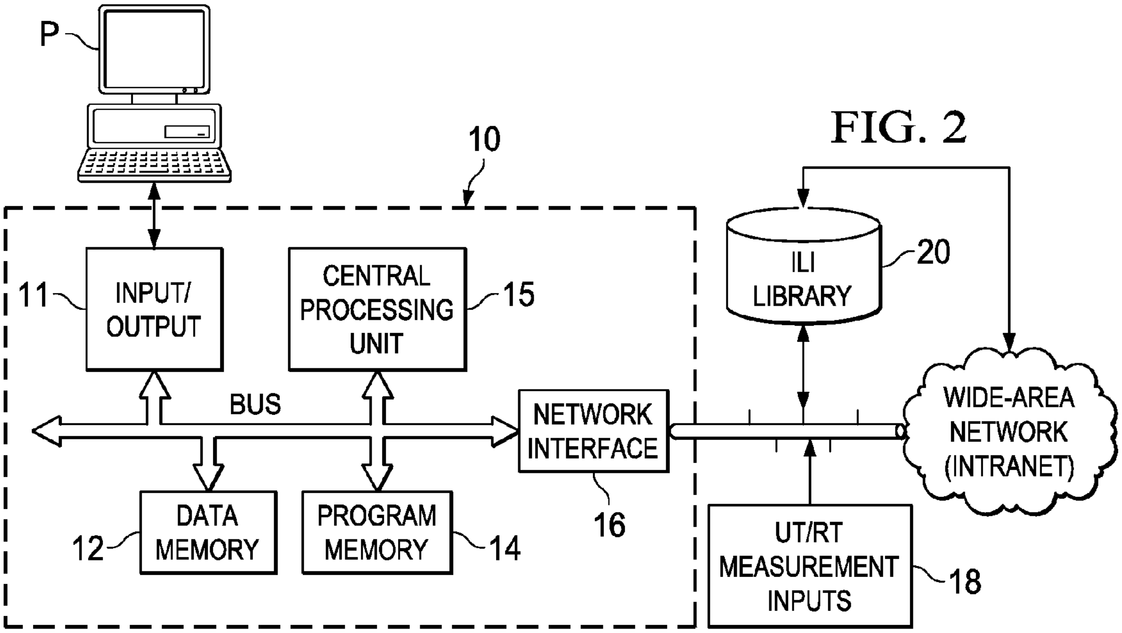
FIG. 2
FIG. 4
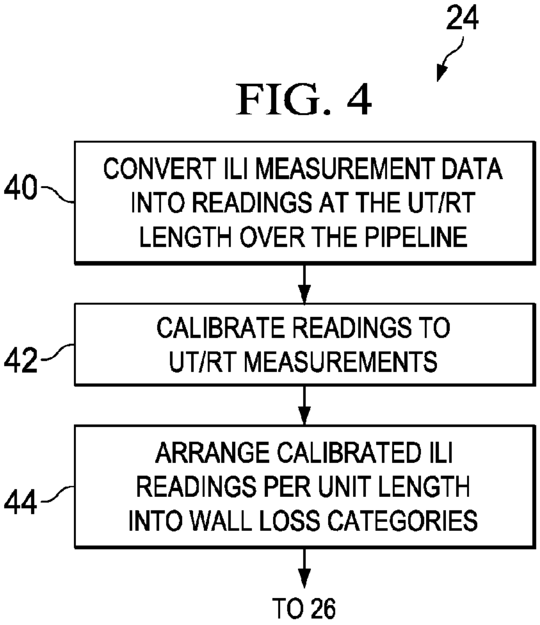

RAPID DATA-BASED DATA ADEQUACY PROCEDURE FOR PIPELINE INTEGRITY ASSESSMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of pipeline inspection, and is more specifically directed to the evaluation of the amount of pipeline inspection that is necessary to ensure pipeline integrity.

Maintaining the integrity of pipelines is a fundamental function in maintaining the economic success and minimizing the environmental impact of modern oil and gas production fields and systems. In addition, pipeline integrity is also of concern in other applications, including factory piping systems, municipal water and sewer systems, and the like. Similar concerns exist in the context of other applications, such as production casing of oil and gas wells. As is well known in the field of pipeline maintenance, corrosion and ablation of pipeline material, from the fluids flowing through the pipeline, will reduce the thickness of pipeline walls over time. In order to prevent pipeline failure, it is of course important to monitor the extent to which pipeline wall thickness has been reduced, so that timely repairs can be made.

The direct physical measurement of pipeline wall thickness is of course not practical because of the necessarily destructive nature of such measurement. Accordingly, various indirect pipeline wall thickness measurement techniques have been developed over the years. The most widely used measurement technologies acquire measurements of thickness at selected locations along a producing pipeline, such locations either randomly selected or specifically selected based on models or other assumptions of the most vulnerable locations to loss of wall thickness. These measurement technologies include ultrasonic measurement, and imaging by way of x-rays or radiography (RT), each of which examine pipeline walls from the exterior at specific locations (e.g., over a one foot section). It is typically costly, from the standpoint of labor and equipment cost, to measure wall thickness using these methods, especially in extreme environments such as the Trans-Alaska Pipeline System and its feeder lines where thermal insulation must be removed to access the pipeline for measurement, and then replaced. In addition, because the exterior of the pipeline must be directly accessed to obtain these measurements, excavation is required to obtain measurements of those portions of pipelines that are underground.

In the context of pipeline integrity, it is of course the extreme value of minimum wall thickness (maximum wall thickness loss) that is of concern. Accordingly, sampled measurement approaches are useful only to the extent that the sample measurements lend insight into the extreme minimum value. Fundamental statistical theory can provide such insight, under the assumption that the population of wall thickness measurements along the entire length of the pipeline (e.g., a measurement taken in each one-foot section along the pipeline length) follows a known statistical distribution. In other words, assuming a statistical distribution of wall thicknesses along the length of the pipeline, a reasonable sample size of measurements can then provide an indication of the minimum wall thickness to a certain confidence level. Unfortunately, it has been observed that measurements of wall thickness along the length of an actual pipeline do not typically follow a well-behaved statistical distribution. Worse yet, it has been observed that wall thickness measurement distributions vary widely from pipeline to pipeline. As a result, it is difficult to know whether the number of sampled measurements of pipeline thickness taken for a given pipeline is sufficient to characterize the extreme value of minimum wall thickness for that pipeline, to any reasonable confidence level.

Another pipeline wall thickness measurement technology is referred to as "in-line inspection" (ILI). According to this technology, a vehicle commonly referred to as a "pig" travels in the interior of the pipeline along its length, propelled by the production fluid itself or otherwise towed through the pipeline. The pig includes transducers that indirectly measure the wall thickness of the pipeline repeatedly along the pipeline length as the pig travels. Measurement technologies used in ILI include magnetic flux leakage techniques that measure the extent to which a magnetic field can be induced into the pipeline wall is measured, from which the wall thickness can be inferred. ILI inspection can also be carried out using ultrasonic energy, as well-known in the art. Unfortunately, ILI monitoring cannot be applied to all pipelines, because of their construction or geometry. Sampled measurements must therefore be used on a substantial number of pipelines in modern production fields and pipeline systems.

A known approach to the characterization of pipeline integrity applies sample thickness measurements to a predictive model of the pipeline. Known models apply parameters such as properties of the fluid carried by the pipeline, pressure, temperature, flow rate, and the like, such that a minimum wall thickness can be calculated given sample measurements of the wall thickness. The accuracy of such computer simulations in characterizing the minimum wall thickness of course depends on the accuracy with which the model corresponds to the true behavior of the pipeline. And, in turn, the accuracy of the model depends on the accuracy of the assumptions underlying the model to the actual pipeline. But in practice, as known in the art, real-world pipelines vary widely from one another in corrosion behavior, due to structural and environmental variations that are not contemplated by the model or its underlying assumptions. As more complicated models are derived to include the effects of these variations, the resulting computations will of course also become more complicated.

By way of further background, it is known to evaluate equipment reliability by selecting a statistical distribution, and applying Monte Carlo simulations to that statistical distribution, to plan a reliability evaluation.

BRIEF SUMMARY OF THE INVENTION

It is therefore an object of this invention to provide a method and system by way of which one can determine a sufficient sample size of pipeline wall thickness measurements to ensure that, at a given confidence level, a minimum wall thickness limit has not been reached.

It is a further object of this invention to provide such a method and system that provides improved confidence in the adequacy of sample pipeline wall thickness measurements.

It is a further object of this invention to provide such a method and system that improves the efficiency of pipeline wall thickness measurement resources.

It is a further object of this invention to provide such a method and system that can determine the sufficient sampling size through a computer algorithm that can be executed rapidly for a large number of pipelines.

It is a further object of this invention to provide such a method and system that can so determine the sufficient sample size by utilizing available information on pipeline corrosion distributions that have been characterized by a 100% inspection process for pipelines, such as in-line inspection (ILI).

Other objects and advantages of this invention will be apparent to those of ordinary skill in the art having reference to the following specification together with its drawings.

The present invention may be implemented into a computerized method, an evaluation system programmed to perform the method, and a computer program stored in a computer readable medium, by way of which sample coverage of external pipeline wall thickness measurements can be determined to achieve a desired statistical confidence level. A library of measurement data acquired by a 100% inspection method, such as in-line inspection, for a subset of the pipelines is stored in a database. These library data are arranged into distributions of measurements for each pipeline, for example by percentage deciles of pipeline wall thickness loss. For each pipeline in the database, Monte Carlo sampling is performed for each of a plurality of sample coverages. The results of each sampling are evaluated to associate a sample coverage with a confidence level for identifying an extreme value of wall loss. For a pipeline under investigation for which sampled wall thickness measurements have been obtained, the distribution of the sampled wall thickness measurements is compared with the distributions of similar pipelines in the 100% inspection library. The sample coverage required for a given confidence level for a given conclusion is then determined from the Monte Carlo results for the one or more most similar pipelines in the library to the pipeline under investigation. If indicated by the results, new samples may be obtained from the pipeline to increase the sample coverage and thus satisfy the requirement for a given confidence level.

BRIEF DESCRIPTION OF THE SEVERAL VIEWS OF THE DRAWING

FIG. 2 is an electrical diagram, in block form, of an evaluation system programmed to carry out an embodiment of the invention.

FIG. 4 is a flow diagram illustrating the generation of calibrated distributions in the process of FIG. 3, according to an embodiment of the invention.

DETAILED DESCRIPTION OF THE INVENTION

The present invention will be described in connection with its embodiments, including its preferred embodiment, in connection with a method and system for monitoring and evaluating pipeline integrity in a production field and system for oil and gas. However, it is contemplated that this invention can also provide important benefit in other applications, including the monitoring and evaluating of production casing integrity in oil and gas wells, and the monitoring and evaluating of pipeline integrity in other applications such as water and sewer systems, natural gas distribution systems on the customer side, and factory piping systems, to name a few. Accordingly, it is to be understood that the following description is provided by way of example only, and is not intended to limit the true scope of this invention as claimed.

Figure 1:
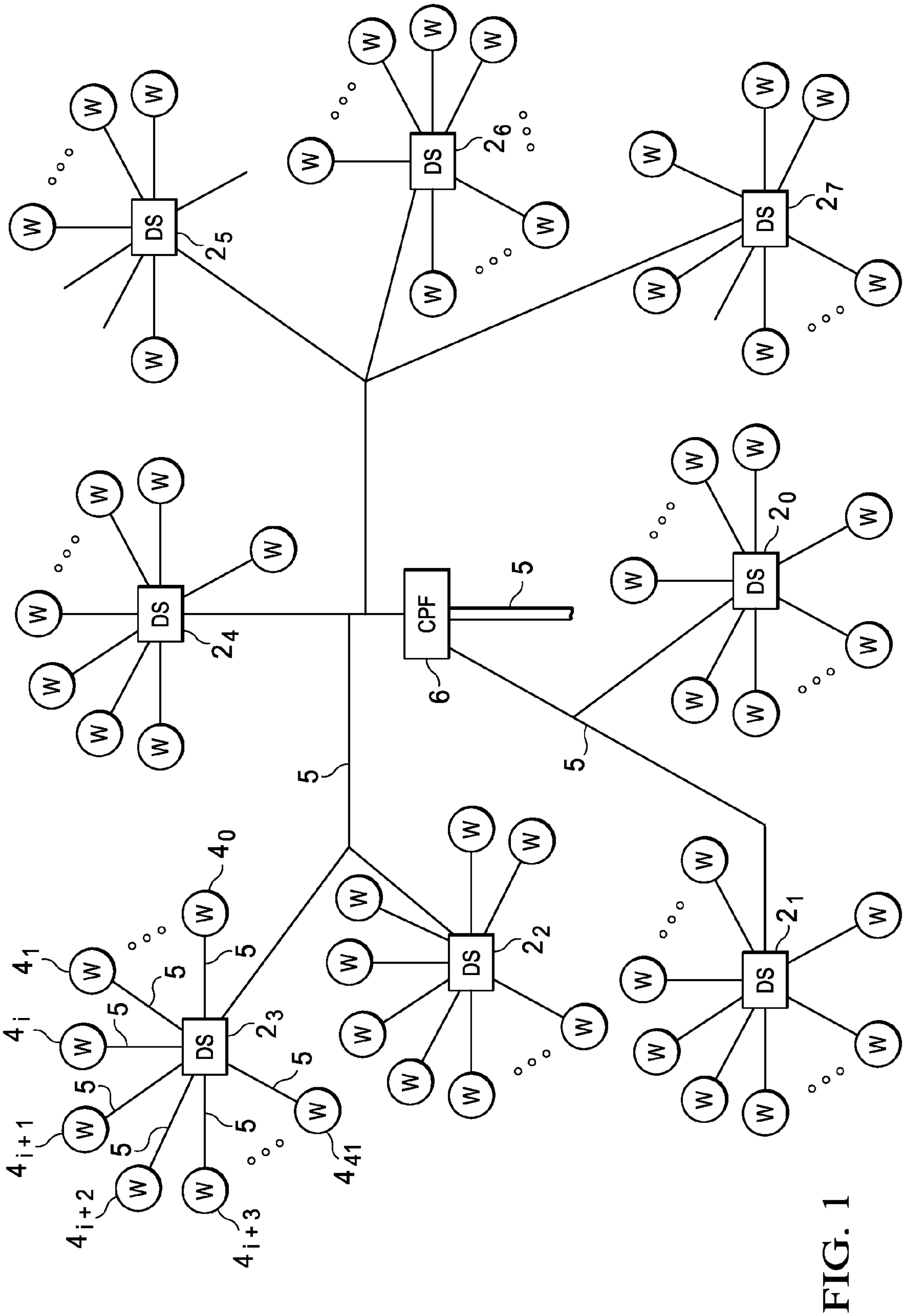
FIG. 1 is a schematic diagram of an example of a production field in connection with which the preferred embodiment of the invention may be used.

Referring first to FIG. 1, an example of an oil and gas production field, including surface facilities, in connection with which an embodiment of the invention may be utilized, is illustrated in a simplified block form. In this example, the production field includes many wells 4, deployed at various locations within the field, from which oil and gas products are to be produced in the conventional manner. While a number of wells 4 are illustrated in FIG. 1, it is contemplated that modern production fields in connection with which the present invention may be utilized will include many more wells than those wells 4 depicted in FIG. 1. In this example, each well 4 is connected to an associated one of multiple drill sites 2 in its locale by way of a pipeline 5. By way of example, eight drill sites $\mathbf{2}_0$ through $\mathbf{2}_7$ are illustrated in FIG. 1; it is, of course, understood by those in the art that many more than eight drill sites 2 may be deployed within a production field. Each drill site 2 may support many wells 4; for example drill site $\mathbf{2}_3$ is illustrated in FIG. 1 as supporting forty-two wells $\mathbf{4}_0$ through $\mathbf{4}_{41}$. Each drill site 2 gathers the output from its associated wells 4, and forwards the gathered output to central processing facility 6 via one of pipelines 5. Eventually, central processing facility 6 is coupled into an output pipeline 5, which in turn may couple into a larger-scale pipeline facility along with other central processing facilities 6.

In the real-world example of oil production from the North Slope of Alaska, the pipeline system partially shown in FIG. 1 connects into the Trans-Alaska Pipeline System, along with many other wells 4, drilling sites 2, pipelines 5, and processing facilities 6. Thousands of individual pipelines are interconnected in the overall production and processing system connecting into the Trans-Alaska Pipeline System. As such, the pipeline system illustrated in FIG. 1 can represent a miniscule portion of an overall production pipeline system.

While not suggested by the schematic diagram of FIG. 1, in actuality pipelines 5 vary widely from one another in construction and geometry, in parameters including diameter, nominal wall thickness, overall length, numbers and angles of elbows and curvature, location (underground, above-ground, or extent of either placement), to name a few. In addition, parameters regarding the fluid carried by the various pipelines 5 also can vary widely in composition, pressure, flow rate, and the like. These variations among pipeline construction, geometry, contents, and nominal operating condition affect the extent and nature of corrosion and ablation of the pipeline walls, as known in the art. In addition, it has been observed, in connection with this invention, that the distribution of wall loss (i.e., wall thickness loss) measurements along pipeline length also varies widely among pipelines in an overall production field, with no readily discernible causal pattern relative to construction or fluid parameters.

As mentioned above, some pipelines in a production pipeline system such as that illustrated in part in FIG. 1 can be fully inspected, from the standpoint of pipeline wall thickness, along their entire length by way of in-line inspection (ILI). As known in the art, ILI involves the insertion of a measurement tool, commonly referred to as a "pig", into the pipeline. Conventional measurement pigs are generally cylindrical bodies that include navigational or positional systems to monitor the location of the pig in the pipeline, along with instrumentation for measuring pipeline wall thickness as the pig travels along the pipeline propelled by the production fluid. Alternatively, the pig may be towed along the pipeline, if the pipeline is being measured while shutdown. Conventional ILI pigs measure loss of pipeline wall thickness using the technologies of magnetic flux leakage (MFL), ultrasonic tomography, electrostatic induction and the like. Examples of conventional ILI pigs suitable for obtaining ILI measurements include the CPIG MFLCAL ILI instruments available from Baker Hughes Pipeline Management Group, and the HIRES metal loss mapping tools available from Rosen Inspection Technologies.

As known in the art, and as mentioned above, a sizeable number of pipelines 5 in a large-scale pipeline system are "unpiggable", in that those pipelines cannot be inspected by way of ILI for one or more various reasons. For example, access to the pipeline may be restricted, valves or other impassable fittings may impede the travel of a pig through the pipeline, or a given pipeline may have varying diameter along its length such that a pig cannot snugly engage the pipeline walls as it travels. However, the operator of the production field must also monitor these unpiggable pipelines for loss of wall thickness. As discussed above, the monitoring of these unpiggable pipelines 5 is performed by sample measurements taken externally along the length of the pipeline, using conventional methods such as ultrasonic tomography (UT) and radiography (RT); other conventional measurement technologies are also suitable for use in connection with embodiments of the invention. In this example, conventional UT/RT measurements are typically obtained as the average of wall thickness measurements over some incremental distance (e.g., one foot) along the length of the pipeline. Conventional sampled UT/RT wall thickness measurements involve a substantial amount of labor, such as removing insulation or coatings from the pipeline, and physically traveling between sample locations. As such, sampled UT/RT wall thickness measurements are typically performed on a periodic scheduled basis, especially in large-scale pipeline systems. For pipeline systems in a hostile climate, such as northern Alaska, such pipeline wall thickness measurements are preferably obtained in summer months, because some locations along some pipelines may require special precautions to be safely accessible in winter.

Because the goal of the monitoring is to determine the maximum pipeline wall loss along a given pipeline to enable timely maintenance operations, it is essential to obtain a sufficient number of samples to have reasonable confidence in the conclusions drawn from the results of that sampling. Embodiments of this invention provide an accurate answer regarding how much sampling is sufficient for a given pipeline, without relying on assumptions underlying fluid mechanic models of the pipeline and the like.

FIG. 2 illustrates the construction of evaluation system 10 according to an example of an embodiment of the invention, as realized by way of a computer system. Evaluation system 10 performs the operations described in this specification to determine the adequacy of sample coverage for a pipeline to determine the extreme value of pipeline wall loss. Of course, the particular architecture and construction of a computer system useful in connection with this invention can vary widely. For example, evaluation system 10 may be realized by a computer based on a single physical computer, or alternatively by a computer system implemented in a distributed manner over multiple physical computers. Accordingly, the generalized architecture illustrated in FIG. 2 is provided merely by way of example.

As shown in FIG. 2, evaluation system 10 includes central processing unit 15, coupled to system bus BUS. Also coupled to system bus BUS is input/output interface 11, which refers to those interface resources by way of which peripheral functions P (e.g., keyboard, mouse, display, etc.) interface with the other constituents of evaluation system 10. Central processing unit 15 refers to the data processing capability of evaluation system 10, and as such may be implemented by one or more CPU cores, co-processing circuitry, and the like. The particular construction and capability of central processing unit 15 is preferably selected according to the application needs of evaluation system 10, such needs including, at a minimum, the carrying out of the functions described in this specification, and also including such other functions as may be desired to be executed by computer system. In the architecture of evaluation system 10 according to this example, data memory 12 and program memory 14 are also coupled to system bus BUS, and provide memory resources of the desired type useful for their particular functions. Data memory 12 stores input data and the results of processing executed by central processing unit 15, while program memory 14 stores the computer instructions to be executed by central processing unit 15 in carrying out those functions. Of course, this memory arrangement is only an example, it being understood that data memory 12 and program memory 14 can be combined into a single memory resource, or distributed in whole or in part outside of the particular computer system shown in FIG. 1 as implementing evaluation system 10. Typically, data memory 12 will be realized, at least in part, by high-speed random-access memory in close temporal proximity to central processing unit 15. Program memory 14 may be realized by mass storage or random access memory resources in the conventional manner, or alternatively may be accessible over network interface 16 (i.e., if central processing unit 15 is executing a web-based or other remote application).

Network interface 16 is a conventional interface or adapter by way of which evaluation system 10 accesses network resources on a network. As shown in FIG. 2, the network resources to which evaluation system 10 has access via network interface 16 can include those resources on a local area network, as well as those accessible through a wide-area network such as an intranet, a virtual private network, or over the Internet. In this embodiment of the invention, sources of data processed by evaluation system 10 are available over such networks, via network interface 16. Library 20 stores measurements acquired by in-line inspection (ILI) for selected pipelines in the overall production field or pipeline system; ILI library 20 may reside on a local area network, or alternatively be accessible via the Internet or some other wider area network. It is contemplated that ILI library 20 may also be accessible to other computers associated with the operator of the particular pipeline system. In addition, as shown in FIG. 2, measurement inputs 18 acquired by sampled ultrasonic or radiography (UT/RT) for other pipelines in the production field or pipeline system are stored in a memory resource accessible to evaluation system 10, either locally or via network interface 16.

Of course, the particular memory resource or location in which the UT/RT measurements 18 are stored, or in which ILI library 20 resides, can be implemented in various locations accessible to evaluation system 10. For example, these data may be stored in local memory resources within evaluation system 10, or in network-accessible memory resources as shown in FIG. 2. In addition, these data sources can be distributed among multiple locations, as known in the art. Further in the alternative, the measurements corresponding to UT/RT measurements 18 and to ILI library 20 may be input into evaluation system 10, for example by way of an embedded data file in a message or other communications stream. It is contemplated that those skilled in the art will be readily able to implement the storage and retrieval of UT/RT measurements 18 and ILI library 20 in a suitable manner for each particular application.

According to this embodiment of the invention, as mentioned above, program memory 14 stores computer instructions executable by central processing unit 15 to carry out the functions described in this specification, by way of which UT/RT measurements 18 for a given pipeline are analyzed to determine whether a sufficient number of measurements have been acquired to attain a particular confidence level for a particular conclusion regarding an extreme value measurement of that pipeline. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. For example, an embodiment of the invention has been realized as an executable within the ACCESS database application using Visual Basic Algorithm (VBA) instructions to provide output in the form of an EXCEL spreadsheet, which is beneficial because of the relatively low level of user training that is required. It is contemplated that those skilled in the art having reference to this description will be readily able to realize, without undue experimentation, this embodiment of the invention in a suitable manner for the desired installations. Alternatively, these computer-executable software instructions may, according to the preferred embodiment of the invention, be resident elsewhere on the local area network or wide area network, accessible to evaluation system 10 via its network interface 16 (for example in the form of a web-based application), or these software instructions may be communicated to evaluation system 10 by way of encoded information on an electromagnetic carrier signal via some other interface or input/output device.

Figure 3:
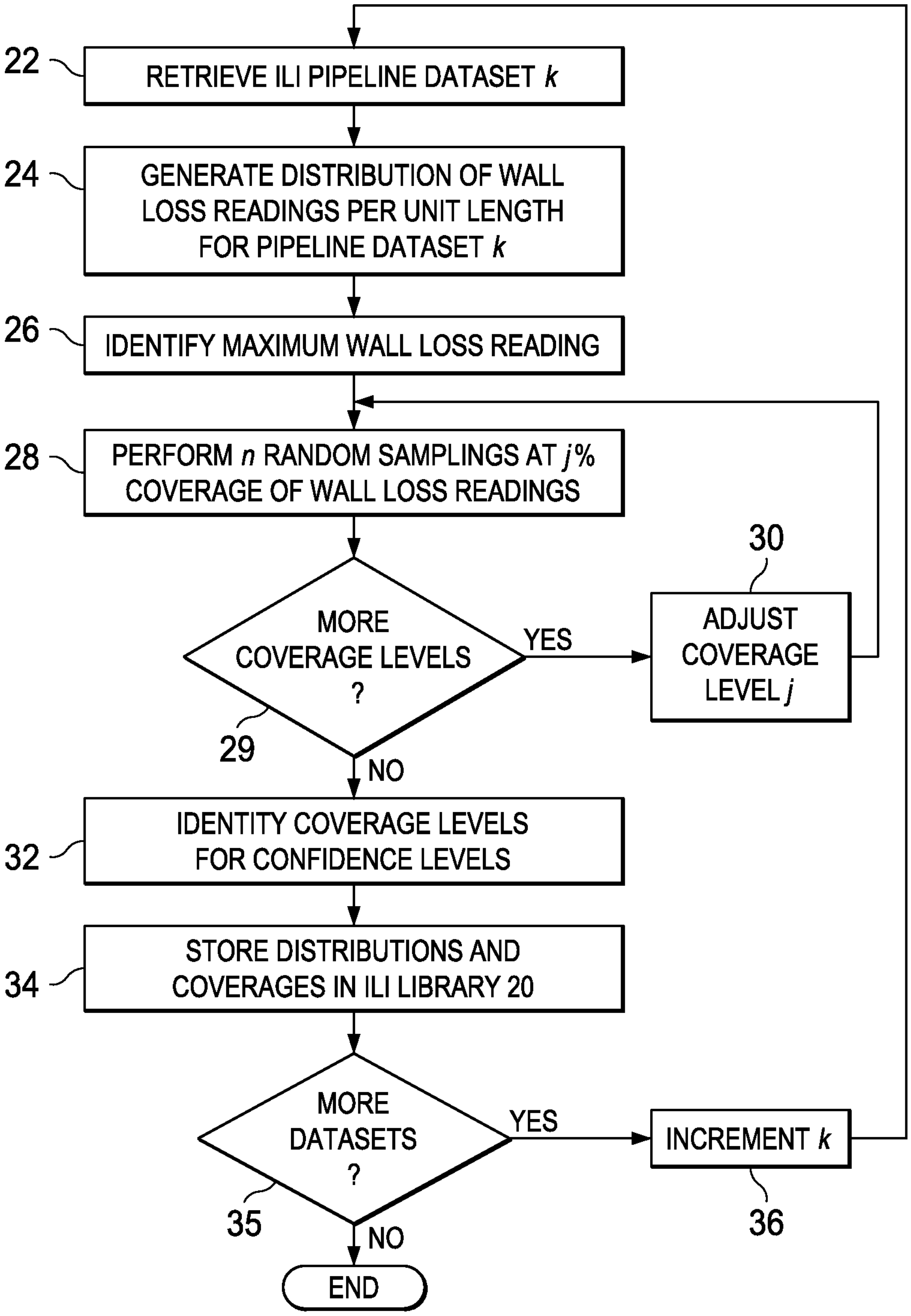
FIG. 3 is a flow diagram illustrating the generation of an in-line inspection calibrated measurement library, according to an embodiment of the invention.

According to this embodiment of the invention, ILI library 20 includes measurement data for each of those pipelines in the system upon which in-line inspection (ILI) has been carried out, and also statistical information based on those measurements. The pipelines and datasets for which ILI measurements have been made, processed, and stored in ILI library 20 will serve as "reference pipelines" for determining the statistical validity of conclusions to be drawn from the sampled measurement of other pipelines, according to this embodiment of the invention. Referring now to FIG. 3, the building of ILI library 20 from ILI measurements acquired on one or more pipelines in the overall system, according to this embodiment of the invention, will now be described. According to this embodiment of the invention, evaluation system 10 may itself build ILI library 20, or alternatively another computer system may build ILI library 20. As such, the particular computer system that carries out the processing illustrated in FIG. 3 to build ILI library 20 is not of particular importance in connection with this invention. As evident from the nature of the processing of FIG. 3, the building of ILI library 20 need only be done once, in advance of the operations to be carried out by evaluation system 10 in analyzing the sufficiency of sampled measurements according to this embodiment of the invention; if additional ILI measurement datasets are acquired for pipelines in the production field or pipeline system, these additional ILI measurements can be processed and added into ILI library 20, without recalculation of the distributions and statistics already in ILI library 20.

In process 22, the in-line inspection data for a pipeline are retrieved. The in-line inspection dataset k retrieved in process 22 includes measurements taken along the entire length of a pipeline, at a spacing determined by the particular ILI technology and system used to acquire the data. These data may be retrieved in process 22 from a memory resource or over a network, or otherwise received by the operative computer system involved in building ILI library 20.

In process 24, the operative computer system generates a distribution of wall loss thickness measurements for the pipeline from dataset k retrieved in process 22. FIG. 4 illustrates process 24 in more detail, according to this embodiment of the invention. In process 40, the ILI measurement data are converted into measurements at a unit length corresponding to the unit length of sampled measurements. For example, the length of interest for a sampled UT/RT measurement may be a one-foot interval along the length of a pipeline. It is likely that ILI measurements do not correspond to one-foot intervals, but instead present data more finely (i.e., effectively continuous) than the sampled UT/RT measurements. Accordingly, in process 40, the operative computer system converts the ILI measurement data into the desired unit of measurement (e.g., percent wall loss) at the unit length of interest (e.g., one-foot lengths) corresponding to the UT/RT measurements carried out by the measurement operator. This conversion can be carried out by conventional techniques, for example by selecting and storing the maximum wall loss measurement within each of the desired intervals.

It has been observed, in connection with this invention, that pipeline wall loss measurements vary among measurement technology. More specifically, it has been observed that a bias exists between ILI measurements and those obtained from UT/RT inspections (with UT and RT measurements observed to correspond well with one another). This bias is somewhat difficult to characterize because ILI measurement of wall loss for a given pipeline typically indicates a far greater percentage of length of minimal thickness loss than do sampled measurements by way of UT or RT for that same pipeline. This high percentage of minimal loss renders the derivation of a rigorous calibration equation somewhat difficult. However, because the goal of pipeline integrity monitoring, by either technology, is primarily concerned with detecting the extreme value of wall loss (i.e., the location of first failure), a useful calibration function can be derived by comparing only those measurements of relatively high (e.g., >20%) wall loss among the various technologies. This truncation of the measurements can provide a useful calibration function. Accurate calibration renders the ILI measurements useful in characterizing the distribution of the UT/RT measurements according to this embodiment of the invention, as will be described below.

In one example, a calibration of ILI wall loss measurements to UT wall loss measurements has been performed from a regression of maximum wall loss values for several pipelines, as detected by ILI measurements, with maximum wall loss values for those same pipelines as detected by UT sampling. This regression used only those ILI values greater than 20% wall loss, and excluded obvious exceptions. In addition, this regression does not require the ILI measurement to be at the same physical location along the pipeline as a corresponding UT (or RT) measurement. The result of this regression provided the following relationship of maximum wall loss thickness $UT_{max}$ as measured by sampled ultrasonic tomography to the corresponding ILI maximum wall loss thickness as measured $ILI_{max}$:

$$UT_{max}=2.18+1.18(ILI_{max})$$

Of course, it is contemplated that a different calibration scheme may be applied, depending on the particular measurement technologies and apparatus used in each case, differences in the pipelines and the nature of the fluid carried, whether a higher order calibration is desired, and the like. Once a calibration function is defined, preferably from analysis of a reasonable number of pipelines with both ILI and UT or RT wall loss measurements, calibration process 42 is performed over the ILI wall loss measurements for pipeline dataset k according to that function.

In process 44, the operative computer system arranges the calibrated ILI readings from process 42 into categories of wall loss, in a manner similar to a histogram. In this embodiment of this invention, as will be described below, questions of interest from the sampled UT/RT measurements include i) whether a pipeline for which no UT/RT measurement exceeds 30% may in fact have a location at which wall loss exceeds 30%; and ii) whether a pipeline for which no UT/RT measurement exceeds 50% in fact has any location at which wall loss exceeds 50%. According to this embodiment of the invention, a useful arrangement of measurements produced by process 44 indicates the percentage or fraction of calibrated ILI readings in pipeline dataset k over the entire length of pipeline that fall within each decile interval of wall loss (e.g., <10% wall loss, between 10% wall loss and 20% wall loss, between 20% and 30% wall loss, etc.). An example of such an arrangement, for a hypothetical pipeline for which calibrated ILI measurements have been derived, can be expressed in tabular form, which is convenient for storing in a conventional database:

| Readings (length in feet) | 0% | 6-10% wall loss | 10-20% wall loss | 20-30% wall loss | 30-40% wall loss | 40-50% wall loss | >50% wall loss |
|---|---|---|---|---|---|---|---|
| 32377 | 27657 (85.42%) | 331 (1.02%) | 2191 (6.77%) | 1543 (4.77%) | 557 (1.72%) | 86 (0.27%) | 12 (0.04%) |

In this example, the hypothetical pipeline is 32377 feet long, and thus has 32377 ILI measurements in one-foot intervals along its length. It is also useful to retain some indication of the date at which the ILI measurements are obtained for each pipeline. As evident from this example, calibration process 42 precedes the arrangement of the readings into a distribution in process 44. Alternatively, a distribution of the ILI measurements can be generated prior to calibration, and the distribution then calibrated according to a calibration function, if desired. In any event, the generation of a calibrated distribution of ILI measurements over the pipeline from its dataset k is performed in process 24.

According to this embodiment of the invention, it is useful to identify the maximum wall loss detected by ILI for pipeline k, as calibrated to a UT/RT reading. As will be described below, knowledge of the maximum wall loss enables a determination of the sample coverage required to provide a desired level of confidence that the highest sampled wall loss is within 10% of the true maximum wall loss. The calibrated ILI measurements for pipeline k generated in process 24 are interrogated by the operative computer system to identify this maximum reading, in process 26.

In addition to the calibrated distribution of measurements from each pipeline, according to this embodiment of the invention, ILI library 20 also includes the statistical behavior of random samples taken of these calibrated wall loss measurements for each pipeline. This behavior is determined, according to this embodiment of the invention, beginning with process 28, in which a Monte Carlo simulated sampling is performed to randomly sample the calibrated ILI wall loss measurements in pipeline dataset k that were obtained along the length of the pipeline. Alternatively, the distribution of calibrated ILI measurements may be idealized (e.g., all readings between 10% and 20% are considered to be 15%) within the intervals, and the idealized distribution is sampled, if desired. In either case, each instance of process 28 samples the distribution of calibrated ILI measurements in pipeline dataset k to a specified sample coverage level of j%. For example, a first instance of process 28 may randomly sample 0.1% of the calibrated ILI measurements. The sample measurements acquired in this random sampling are then evaluated according to particular questions of interest in the statistical analysis. For example, the randomly sampled measurements may be evaluated to determine whether any measurements exceed 30% wall loss, whether any measurements exceed 50% wall loss, and whether any measurements are within 10% of the maximum wall loss reading over the pipeline (as identified in process 26). The results of this evaluation are then stored in memory. This Monte Carlo simulated sampling of the calibrated ILI measurements, at j% coverage, is repeated n times in process 28, with n being a relatively large number (e.g., on the order of thousands, for example ten thousand samples), and the results recorded for each sample. Decision 29 is performed to determine whether additional coverage levels are also to be analyzed; if so (decision 29 is YES), the coverage level j% is adjusted to the next sample coverage in process 30, and process 28 and decision 29 are repeated for this new adjusted coverage level j%. For example, the sample coverage may be adjusted by 0.1%, at least up to a certain sample coverage level, at which point the step size may be larger. A maximum sample coverage can be determined based on the practical limit of UT/RT measurement coverage in the field (e.g., 7% or 10% coverage may be the maximum practical limit, for reasons of cost).

After completion of the random sampling of process 29 for each coverage level of 1%, process 32 is then performed to identify the sample coverage required for various confidence levels. These various confidence levels reflect upon the particular conclusions that are to be drawn from the eventual UT/RT sample testing of other pipelines. For example, the analysis may be interested in the following questions for a pipeline that has been sampled using UT or RT wall loss measurement technology:

(1) What is the required sample coverage of the pipeline corresponding to pipeline dataset k in order for random sampling to determine, to confidence levels of 80% and 95%, that the maximum wall loss is <30%?

(2) What is the required sample coverage of the pipeline corresponding to pipeline dataset k in order for random sampling to determine, to confidence levels of 80% and 95%, that the maximum wall loss is <50%?

(3) What is the required sample coverage of the pipeline corresponding to pipeline dataset k in order for random sampling to determine, to confidence levels of 80% and 95%, that the maximum wall loss measurement from sampling is within 10% of the actual worst wall loss along the pipeline?

Of course, the confidence levels (80%, 95%) and wall loss threshold levels (30%, 50%) of interest will depend on the sensitivity to wall loss of the operator, and the needs of the analyst. And the availability of an answer to any of the questions will depend on the maximum wall loss reading; if no reading for pipeline exceeds 50%, then question (2) above will have no answer. These answers can be determined from the repeated sampling of process 28 for the various sample coverage levels. For the example of pipeline dataset k shown in the above table, which has a maximum calibrated wall loss measurement via ILI that is above 50%, the results of the Monte Carlo simulation will have a count of how many of the n randomly obtained sample sets, at each sample coverage level of j%, included a sample value of greater than 30%, of greater than 50%, and of within 10% of the true maximum. These likelihoods are derived in process 32 for the desired results, such as the questions (1) through (3) above, and expressed as a fraction or percentage. For the example of the hypothetical pipeline tabulated above:

| | Maximum sample value > 30% | Maximum sample value > 50% | Maximum sample value within 10% of true maximum |
|---|---|---|---|
| 80% confidence | 0.1% coverage | 0.3% coverage | 5.0% coverage |
| 95% confidence | 0.3% coverage | 5.0% coverage | >10% coverage |

In other words, for the distribution of calibrated ILI measurements for this hypothetical pipeline, more than 95% of the n sets of random samples at a coverage of 0.3% (each set containing 97 samples randomly taken from the 32377 one-foot interval calibrated measurements) returned a maximum calibrated measurement value that was greater than 30% wall loss. In addition, as indicated by this table, more than 80% of the n sets of random samples at a coverage of 5% returned a maximum calibrated measurement value that was within 10% of the true maximum wall loss measurement. On the other hand, not even 10% sample coverage, which was the highest sample coverage j% evaluated in this case, would result in 95% of the n sets of random samples returning a maximum calibrated measurement value within 10% of the true maximum wall loss measurement.

Returning to FIG. 3, the distribution of calibrated ILI measurements generated in process 24 from pipeline dataset k, and also the sample coverage results to obtain the desired confidence levels for selected maximum measurement thresholds generated in process 32 for that pipeline, are stored in ILI library 20 in association with pipeline dataset k. Decision 35 determines whether additional datasets remain to be added to ILI library 20. These additional datasets may be measurements of other pipelines in the field or system, or additional ILI datasets for any of the same pipelines that were acquired at different times. If so (decision 35 is YES), index k is incremented to point to a next dataset to be processed, that ILI measurement dataset is retrieved in process 22, and the process is repeated. If multiple ILI datasets for the same pipelines are available, the processed results from each of these datasets are stored in ILI library 20, as the statistical behavior of the wall loss measurements may change over times. As will be apparent from the following description, these additional ILI datasets for the same pipeline are individually considered, for purposes of this embodiment of the invention. If no additional datasets remain to be processed (decision 35 is NO), ILI library 20 is complete. Of course, if ILI measurement data is later obtained for other pipelines in the system, or if new ILI measurement data is later obtained for pipelines that are already characterized in ILI library 20, ILI library 20 may be updated to include results from such additional ILI monitoring.

As a result of the process described above relative to FIGS. 3 and 4, ILI library 20 includes, for each analyzed pipeline dataset, an indication of the distribution of wall loss thickness over its length as measured by ILI, and if necessary, as calibrated to a sampling measurement technology. These distributions of wall loss measurements are not theoretical or assumed distributions, but rather are based entirely on actual measurements. In addition, ILI library 20 includes, for each analyzed pipeline dataset, statistics regarding sampling of its wall loss measurement distribution based on a Monte Carlo simulation of such sampling. These statistics include the numbers of samples (i.e., sample coverage) necessary to determine whether a certain level of wall loss is present, to one or more confidence levels. The distribution and statistics stored in ILI library 20 for these pipelines will be used, by analogy, to evaluate the effectiveness of sample measurements taken of other pipelines in the pipeline system, according to this embodiment as will now be described.

Figure 5:
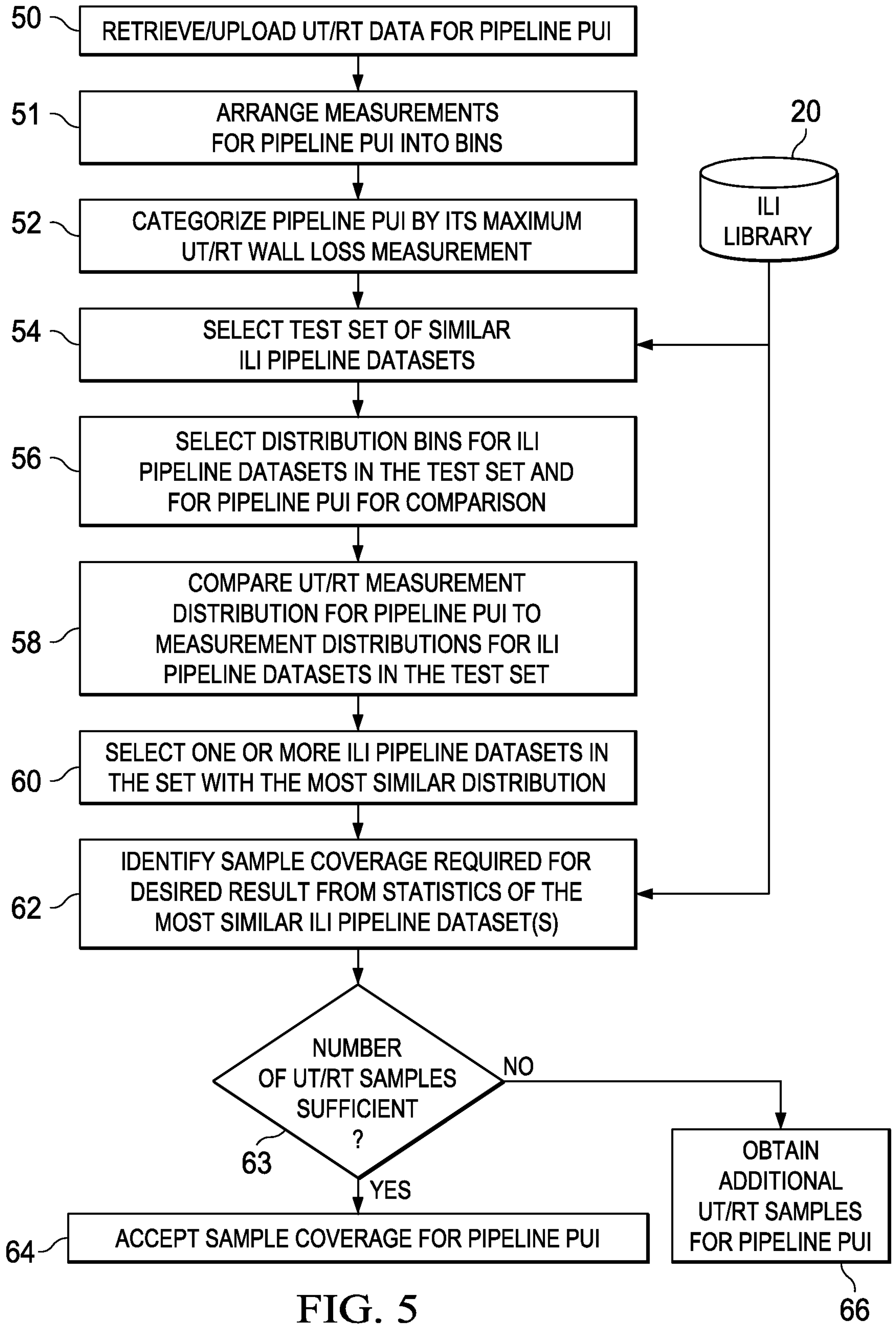
FIG. 5 is a flow diagram illustrating the evaluation of the adequacy of the number of sampled measurements of wall thickness loss for a pipeline under investigation, according to an embodiment of the invention.

According to this embodiment of the invention, once ILI library 20 has been constructed as described above, sample measurements of pipelines other than those for which ILI has been performed can now be compared and analyzed for adequacy of the acquired samples. FIG. 5 illustrates the overall operation of a method of analyzing UT/RT measurements for sufficiency in determining whether an extreme value measurement has been obtained by sampling, according to this embodiment of the invention. It is contemplated that this process will be carried out by evaluation system 10, an example of which is described above relative to FIG. 3, which may be a workstation operated by a human analyst determining the sufficiency of the UT/RT sample coverage for one or more pipelines. As mentioned above in connection with that description of evaluation system 10, it is also contemplated that the computational resources and components carrying out this process may be deployed in various ways, including by way of a web application or other distributed approach.

According to this embodiment of the invention, the analysis of UT/RT measurements for a particular pipeline under investigation (this pipeline referred to herein as "pipeline PUI") begins with the retrieval of the sampled UT/RT measurements from data source 18, shown as process 50 of FIG. 5. Pipeline PUI is typically an "unpiggable" pipeline, for which only sampled measurements of wall loss have been obtained. The retrieved data for pipeline PUI preferably include the number of UT/RT samples acquired, as well as an individual wall loss value for each of the samples. These sample UT/RT measurements may be pre-processed so as to be expressed as a figure of wall thickness loss (e.g., percentage wall loss). In this described example, each UT/RT sample is considered as the maximum percentage wall loss detected over a relatively small interval (e.g., one foot) of the length of pipeline PUI, although other measurements may also be taken or used. The sample interval of the UT/RT measurements should match the interval to which the ILI measurement data were transformed (process 40 of FIG. 4). The data retrieved in process 50 should also include an overall length of pipeline PUI, so that the sample coverage for that pipeline PUI is known.

Upon retrieval of the UT/RT measurement data for pipeline PUI, the next task in the method according to this embodiment of the invention is to identify one or more pipelines for which data are stored in ILI library 20 that have a distribution of wall loss measurements that are most similar to the distribution of UT/RT sample results. In this way, an estimate of the full distribution of wall loss measurements along the entire length of pipeline PUI can be made, and the effectiveness of the UT/RT sample coverage can be statistically determined using this estimated distribution. In this embodiment of the invention, this identification of similar ILI pipelines to the sampled pipeline PUI begins with process 51, in which evaluation system 10 categorizes the sampled measurements for pipeline PUI into "bins", in a manner analogous to a histogram of the wall loss measurements. For example, the wall loss measurements may be binned into deciles of the percentage wall loss (e.g., from 10 to 20% wall loss; from 20 to 30% wall loss, etc.). In process 52, computer system categorizes pipeline PUI according to the maximum wall loss measurement value detected within its UT/RT samples.

Figure 6:
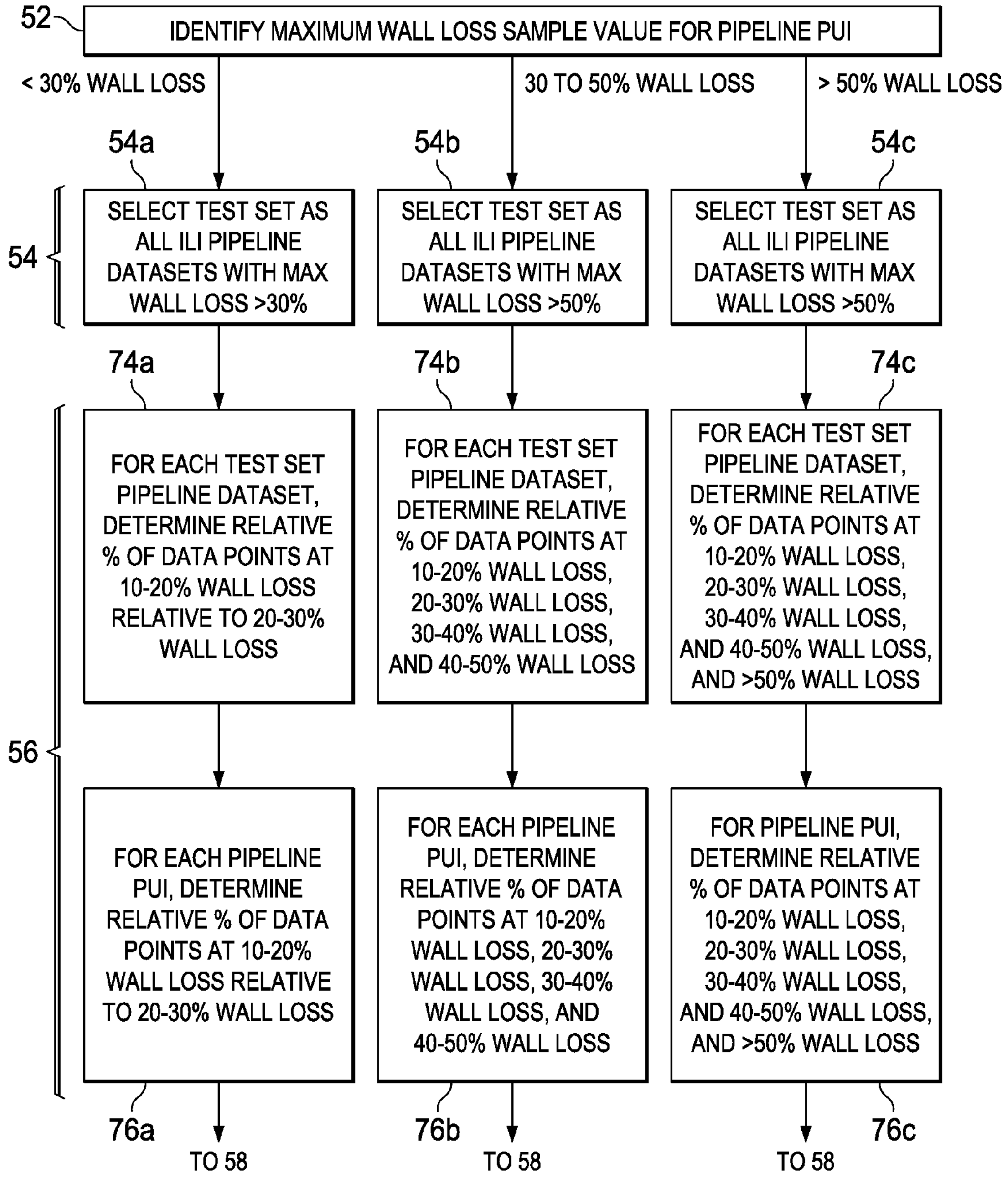
FIG. 6 is a flow diagram illustrating the selection of a test set of similar in-line inspected pipelines and the selection of subsets of statistical distribution of measurements in those pipelines, in the process of FIG. 5 according to an embodiment of the invention.

In process 54, evaluation system 10 accesses ILI library 20 to select a "test set" of pipelines for which ILI measurement data are available and that have been processed, as described above, to have calibrated distributions of their measurements and also sampling statistics associated with those distributions. Process 54 identifies those ILI pipeline data sets (referred to herein as "ILI pipelines") that are similar, in a somewhat coarse sense according to the categorization of process 52, to pipeline PUI under investigation. Once this test set is selected in process 54, according to this embodiment of this invention, process 56 determines the relative populations of measurements in a subset of the bins in the distributions of the ILI pipeline datasets in the test set, and the relative populations of a subset of the bins in the distribution of UT/RT measurements for pipeline PUI itself. FIG. 6 illustrates a particular implementation of processes 52, 54, 56, by way of example, to more clearly describe the operation of this embodiment of this invention. It is to be understood, of course, that the specific bins, limits, etc., as well as the manner in which the selections of processes 52, 54, 56 are made, may vary widely from those in this example of FIG. 6.

As shown in FIG. 6, categorization of pipeline PUI in process 52, according to this example, is based on identification of the maximum wall loss sample value acquired for pipeline PUI and retrieved in process 50. First, a minimum threshold of wall loss may be enforced (not shown in FIG. 6); for example, pipeline PUI may only be considered according to this method if its maximum wall loss measurement exceeds 10% wall loss, and if this 10% threshold is exceeded by three or more measurements. In the example of FIG. 6, process 52 then categorizes pipeline PUI into one of three possible categories of maximum wall loss: i) maximum sample wall loss less than 30%; ii) maximum sample wall loss between 30% and 50%; and iii) maximum sample wall loss greater than 50%. This categorization determines the manner in which the test set of ILI pipeline datasets is defined in process 54, and also the manner in which the bin populations in the measurement distributions are compared in process 56.

For a given pipeline PUI, process 54 is carried out by evaluation system 10 retrieving calibrated distributions for the ILI pipeline datasets in ILI library 20, and executing one of sub-processes 54*a*, 54*b*, 54*c* on those calibrated distributions, with the particular sub-process selected depending on the category into which the maximum wall loss sample value places pipeline PUI in process 52. As mentioned above, the calibrated distributions stored in ILI library 20 and retrieved in process 54 include calibrated distributions for separate pipelines, but may also include multiple calibrated distributions for some pipelines acquired over time (e.g., from annual inspections over the years). In addition to determining the one of sub-processes 54*a*, 54*b*, 54*c* on the retrieved calibrated distributions, the categorization of pipeline PUI performed in process 52 also determines the manner in which the subsets of bins to be compared are defined in process 56. Because, in this example, pipeline PUI may fall into three categories, three different paths are defined through processes 54, 56, as shown in FIG. 6.

If the maximum wall loss sample value measured by UT or RT for pipeline PUI is less than 30%, in this example, process 54*a* derives a test set of ILI pipelines as those ILI pipelines that have a calibrated maximum wall loss measurement that exceeds 30%; all ILI pipelines that have a maximum calibrated wall loss measurement of less than 30% are excluded from the test set. This definition of the test set in process 54 is made because the analysis of this method is intended, in this example, to determine whether sufficient UT/RT samples have been acquired for pipeline PUI to determine that the maximum wall loss does not exceed 30% (question (1) above). This question is pertinent because no sample value obtained by UT/RT for pipeline PUI in fact exceeds 30%, and thus the question remains open; on the other hand, if a sample value of wall loss greater than 30% is present in the sampled UT/RT measurements acquired for pipeline PUI, question (1) is inapplicable. For pipeline PUI falling within the category of maximum wall loss not exceeding 30%, question (2) will typically not be answered, as the answer to question (1) will provide sufficient information for purposes of pipeline integrity (and this answer will also tend to be more accurate in this situation). Question (3) above is pertinent, however, and is answerable as will be described below. The distribution of calibrated ILI measurements for those pipelines having no measurement above 30% provide no insight whatsoever into this question, because even 100% sample coverage of such pipelines will not return a reading above 30%. As such, in this embodiment of the invention, ILI datasets with maximum wall loss measurements below 30% are not considered for any test set.

Once the test set is defined in process 54*a* as those ILI pipeline datasets (i.e., pipelines or datasets, as mentioned above) with calibrated maximum wall loss measurements of greater than 30%, process 74*a* generates the relative populations of measurements within a subset of the bins of the distribution for each of these ILI pipeline datasets in this test set, for comparison with sampled pipeline PUI. In this example, the relative population of measurements within decile wall loss ranges below 30% for pipeline PUI will be compared against the same relative populations for each of the ILI pipeline datasets in the test set. Accordingly, in process 74*a*, evaluation system 10 determines, for each ILI pipeline in the test set identified in process 54*a*, the fraction of its calibrated ILI measurements that are between 10% and 20% wall loss, and the fraction that are between 20% and 30% wall loss, as percentages of the number of calibrated ILI measurements that are between 10% and 30% for that pipeline in the test set. In other words, the measurement values below 10% and above 30% are disregarded in process 74*a*. In this case, only the percentage of measurements between 10% and 20% wall loss, and the percentage that are between 20% and 30%, are considered, with these two bin populations adding up to 100%. For example, we will consider the example of a hypothetical ILI pipeline discussed above having an overall distribution of:

| Readings (length in feet) | 0% | 6-10% wall loss | 10-20% wall loss | 20-30% wall loss | 30-40% wall loss | 40-50% wall loss | >50% wall loss |
|---|---|---|---|---|---|---|---|
| 32377 | 27657 (85.42%) | 331 (1.02%) | 2191 (6.77%) | 1543 (4.77%) | 557 (1.72%) | 86 (0.27%) | 12 (0.04%) |

According to the example of FIG. 6, this hypothetical pipeline would be within the test set selected in process 54*a*, as it has at least one wall loss reading above 30%. In process 74*a*, the subset of bins in this distribution considered in process 74*a* will be:

| 10-20% wall loss | 20-30% wall loss |
|---|---|
| 58.68% (2191/3734) | 41.32% (1543/3734) |

3734 being the sum of the number of calibrated ILI readings in these two categories. As evident from this example, the readings below 10% wall loss and above 30% wall loss are not considered.

In process 76*a*, the bins in the distribution of UT/RT sample readings for pipeline PUI are similarly truncated into a subset, expressed as a relative percentage of measured sample values between 10 and 20% wall loss, and between 20% and 30% wall loss (the sum of the two populations adding to 100%). It is possible, in this situation, that the number of sample values between 20% and 30% will be zero for pipeline PUI; that situation is unlikely for members of the test set of ILI pipeline datasets, considering that each pipeline in that test set has at least one reading above 30%. As will be described below in connection with process 58, the relative populations of the bins for pipeline PUI derived in process 76*a* will be compared against the relative populations of the bins for the ILI pipeline datasets in the test set derived in process 74*a*.

Similar processing is performed in the event that pipeline PUI is categorized in one of the other two groups. Specifically, with reference to FIG. 6, if pipeline PUI has a maximum sample value wall loss between 30% and 50%, process 54*b* defines the test set of ILI pipeline datasets as those that have maximum wall loss readings above 50%. This is because the question of interest for this category of sampled pipelines is question (2) above, namely whether the number of current sample values is sufficient, to a desired confidence interval, to determine whether pipeline PUI has or does not have a maximum wall loss exceeding 50%. In process 74*b*, each pipeline in the test set is processed by computer system to derive a subset of four bins in this example: namely the percentages of calibrated ILI measurements from 10 to 20% wall loss, from 20 to 30% wall loss, from 30 to 40% wall loss, and from 40 to 50% wall loss. The percentages of these four bins for each ILI pipeline dataset in the test set will add up to 100%. The example of the ILI pipeline dataset discussed above relative to process 74*a* would fall within the test set selected in process 54*b*, and the populations in its subset of bins produced by process 74*b* would be:

| 10-20% wall loss | 20-30% wall loss | 30-40% wall loss | 40-50% wall loss |
|---|---|---|---|
| 50.06% (2191/4377) | 35.25% (1543/4377) | 12.73% (557/4377) | 1.96% (86/4377) |

In this case, the calibrated values below 10% and above 50% are discarded, so the percentages of measurements remaining in these deciles add up to 100%. Each ILI pipeline dataset in the test set is similarly processed by evaluation system 10 in process 74*b*. In process 76*b*, the relative populations of sample values obtained for pipeline PUI by UT/RT in the subset of distribution bins are derived, for comparison in process 58 with the distribution subsets for the ILI pipeline datasets in the test set produced in process 74*b*.

In the event that pipeline PUI is categorized in the third category in this example of FIG. 6, with a maximum sample value greater than 50% wall loss, the test set of ILI pipelines selected in process 54*c* is the same test set selected in process 54*b*, namely those ILI pipeline datasets with a maximum calibrated ILI measurement of greater than 50% wall loss. In process 74*c*, each ILI pipeline dataset in this test set is processed by evaluation system 10 to produce relative populations in a subset of bins for that pipeline. In this case, five bins are considered, specifically the four bins produced in process 74*b* plus a fifth bin for the relative percentage of readings exceeding 50% wall loss. The measurements for the ILI pipeline dataset of below 10% wall loss are discarded for purposes of process 74*c*, and thus the relative percentages in these five bins add up to 100%. In process 76*c*, the relative populations of sample values obtained for pipeline PUI are similarly considered in five bins, ignoring the sample values of 10% wall loss and below. The distribution subset for pipeline PUI can then be compared with the distribution subset of each of the ILI pipeline datasets in the test set, in process 58.

As mentioned above, the particular bins and limits derived in processes 54, 56 may vary from those in the example described above. Indeed, these limits may be entirely ad hoc, dependent on the data available for a particular pipeline system. For example, the intervals of 10% (10 to 20% wall loss, 20 to 30% wall loss, etc.) may instead be set to intervals of 5%. The lowest threshold wall loss, below which the measurements and sample values are discarded in process 56, may vary from 10%; indeed, process 56 need not have such a lower threshold but may use all data (including a bin of, for example, 0 to 10% wall loss). In addition, the number of categories into which a pipeline PUI may be categorized may also vary. It is contemplated that the particular approach followed for a pipeline system may be determined by trial and error, with the eventual design of processes 54, 56 being specific for that system.

The comparison of process 58 carried out by evaluation system 10 examines the relative population of each bin generated for pipeline PUI with the relative populations in the same bins generated for each of the ILI pipeline datasets in the test set. It is useful for process 58 to return some figure of merit, reflecting a numerical measure of similarity, to facilitate the ranking of ILI pipeline datasets in the test set according to the similarity of their measurement distribution to that of pipeline PUI. According to this embodiment of the invention, evaluation system 10 performs comparison 58 for each ILI pipeline dataset in the test set, by calculating the difference between the percentage of readings in each bin for pipeline PUI with the percentage of calibrated measurements in that bin for the ILI pipeline dataset, squaring that difference for each bin, and adding the squared differences to produce a comparison value for that ILI pipeline dataset. For the example of a pipeline PUI within the second category (maximum reading between 30% and 50% wall loss), and having relative bin populations produced by process **76*b*** of:

| 10-20% wall loss | 20-30% wall loss | 30-40% wall loss | 40-50% wall loss |
|---|---|---|---|
| 6.14% | 70.18% | 23.03% | 0.66% |

the squared difference values with the hypothetical ILI pipeline above would return (rounded to integers):

| 10-20% wall loss | 20-30% wall loss | 30-40% wall loss | 40-50% wall loss |
|---|---|---|---|
| $(50.06-6.14)^2 =$ 1929 | $(35.25-70.18)^2 =$ 1220 | $(12.73-23.03)^2 =$ 107 | $(1.96-0.66)^2 = 2$ |

returning a sum-of-squares value of 3258. In process 58, this calculation of a figure of merit (e.g., sum of squares of bin-by-bin differences) is performed by system computer 10 for pipeline PUI against each of the ILI pipeline datasets in the test set, using the relative bin populations generated in process 56.

The result of comparison process 58 is then evaluated in process 60, to determine one or more ILI pipeline datasets in the test set with the most similar distributions (i.e., distribution subsets) to that of pipeline PUI. In this embodiment of the invention, process 60 is performed by evaluation system 10 interrogating and ranking the figure of merit (e.g., sum of squares of bin-by-bin differences) derived in process 58. For example, the ILI pipeline datasets in the test set with the three lowest figure of merit values may be selected as the most similar ILI datasets, based on this comparison of the measurement distributions processed in the manner described above.

At this stage of the process, following process 60, one or more ILI pipeline datasets are selected as having measurement distributions, over their entire length, that are most similar to the distribution of sample values acquired by UT/RT for pipeline PUI under analysis. As discussed above, in order to statistically evaluate the sufficiency of the sampling that has been carried out, one must have knowledge of the shape of the distribution of those values in the population from which the samples were taken. At this stage, the one or more most similar ILI pipeline datasets selected in process 60 provide an estimate of the sampling behavior of pipeline PUI. Statistical analysis of the sufficiency of the UT/RT samples already acquired can now be made.

In this real-world situation, however, the distributions of the most similar ILI pipeline datasets identified in process 60 do not necessarily follow a well-behaved theoretical distribution of values for which sampling statistics can be readily derived; indeed, it is unlikely that any such theoretical distribution will apply to the measurement values for actual pipelines. This embodiment of the invention operates on the assumption that the actual distribution of measurements will never follow a theoretical statistical distribution for various reasons, such as non-uniform corrosion rate along the pipeline, the behavior of these distributions as mixed distributions, etc. Therefore, the results of the Monte Carlo simulation performed upon each of the calibrated ILI measurements for these pipelines, and stored in ILI library 20 as described above, are used to provide an estimate of the sufficiency of the sampling performed upon pipeline PUI by way of UT/RT monitoring.

In process 62, system computer 10 identifies the sample coverage required for the desired result, based on the Monte Carlo statistics stored in ILI library 20 for the most similar one or more ILI pipeline datasets selected in process 60. As described above in connection with process 32 in FIG. 3, each ILI pipeline dataset has had various sample coverage levels defined, based on Monte Carlo simulation, for various confidence levels and various result "questions" (e.g., "What is the sample coverage required to ensure, to a 95% confidence level, that a wall loss measurement of >50% will be sampled?"). Referring again to FIG. 5, if a single ILI pipeline dataset is selected in process 60 as most similar to pipeline PUI, then the sample coverage identified in process 62 is determined by the statistics produced for that ILI pipeline dataset in process 32 and stored in ILI library 20. Alternatively, as described above, multiple most similar ILI pipeline datasets (e.g., three) are selected in process 60, and their statistics combined in process 62. Further in the alternative, the number of ILI pipeline datasets selected in process 60 could be determined in a data dependent fashion, for example by considering the closeness of the figures-of-merit from process 58 in determining the number of ILI pipeline datasets to select in process 60.

According to this embodiment of the invention, as mentioned above, two or more similar ILI pipeline datasets are selected in process 60 as most similar to pipeline PUI, for purposes of robustness (i.e., to avoid the risk of spurious selection of a single outlier distribution). Process 62 then identifies the sample coverage for pipeline PUI from some combination of the statistics stored in ILI library 20 for these multiple most similar ILI pipeline datasets. For example, a simple arithmetic average of the statistics may be used. Alternatively, a weighted average of these statistics may be derived. Other alternative combinations of these statistics can be readily derived by those skilled in the art having reference to this specification. In any event, the result of process 62 is to provide sample coverages, or levels of inspection, that are required to validly draw conclusions to specified confidence levels.

For example, consider the following hypothetical ILI pipeline datasets as having been compared to hypothetical pipeline PUI in process 58:

| ILI pipeline dataset | 10-20% wall loss | 20-30% wall loss | 30-40% wall loss | 40-50% wall loss | $\Sigma\Delta^2$ | Similarity rank |
|---|---|---|---|---|---|---|
| A | 66.7 | 19.0 | 9.5 | 4.8 | 6477 | 5 |
| B | 27.6 | 43.4 | 21.2 | 7.8 | 1232 | 3 |
| C | 11.9 | 44.6 | 32.8 | 10.7 | 886 | 1 |
| D | 58.5 | 36.4 | 4.6 | 0.5 | 4226 | 4 |
| E | 23.7 | 43.5 | 28.3 | 4.5 | 1061 | 2 |

As described above, all of the percentages of measurements within a given wall loss decile are percentages of the number of measurements between 10% wall loss and 50% wall loss (and not percentages of all ILI measurements along the pipeline). As evident from this table, the order of similarity of these five hypothetical ILI pipeline datasets to hypothetical pipeline PUI, from most similar to least similar and based on their respective sum of the squares of the differences calculated by system computer 10 in process 58, is: C, E, B, D, A. According to this example, in which the three most similar ILI pipeline datasets are selected, hypothetical pipelines C, E, B are selected in process 60. By way of example, the sample coverage statistics stored in ILI library 20 for these three pipelines C, E, B include:

| ILI pipeline | Any sample > 50% | | Any sample w/in 10% of maximum wall loss | | |
|---|---|---|---|---|---|
| dataset | 80% conf. | 95% conf. | 80% conf. | 95% conf. | Similarity rank |
| B | 2.0% | 3.0% | 2.4% | 3.0% | 3 |
| C | 3.0% | 4.0% | 4.0% | 4.5% | 1 |
| E | 3.7% | 5.0% | 0.5% | 0.9% | 2 |

In this example, a simple arithmetic average of these statistics provides levels of inspection required for these confidence levels for hypothetical pipeline PUI of:

| | Any sample > 50% | | Any sample w/in 10% of maximum wall loss | |
|---|---|---|---|---|
| | 80% conf. | 95% conf. | 80% conf. | 95% conf. |
| PUI | 2.9% | 4.0% | 2.3% | 2.8% |

These levels can then be used to evaluate the number of UT/RT samples actually obtained for hypothetical pipeline PUI, as will now be described.

Referring again to FIG. 5, system computer 10 can now evaluate decision 63 to determine whether the UT/RT sampling performed upon pipeline PUI is adequate to draw the conclusion desired by the human analyst. It is contemplated that the human analyst will indicate or select one or more potential conclusions for evaluation in decision 63. This evaluation simply compares the actual UT/RT sample coverage for the pipeline PUI with the combined statistics for sample coverage determined in process 62, to determine whether that UT/RT sample coverage is adequate to draw the selected conclusions.

An example in which the UT/RT measurements for hypothetical pipeline PUI discussed above amount to a sample coverage of 4.3% (i.e., the number of one-foot intervals measured by UT/RT amount to 4.3% of the entire length of hypothetical pipeline PUI) will be instructive. In this case, based on the table of sample coverages derived from hypothetical ILI pipeline datasets C, E, B, the sample coverage of 4.3% exceeds the required sample coverage of 4.0% for the ">50% wall loss" question at 95% confidence, and the required sample coverage of 2.8% for the "within 10% of maximum" question at 95% confidence. The human analyst can therefore conclude that, if hypothetical pipeline PUI in fact had any location at which wall loss exceeded 50%, the UT/RT sample coverage of 4.3% would have detected that condition at least 95% of the time; in other words, the analysis can conclude with 95% confidence that the sampled hypothetical pipeline PUI does not have any location with greater than 50% wall loss. Also in this case, the human analyst can also conclude, with 95% confidence, that the maximum sampled wall loss value obtained by UT/RT for hypothetical pipeline PUI is within 10% of the true maximum wall loss present in that pipeline.

Referring again to FIG. 5, the result of decision 63 can be used to direct further action. If the sample coverage for the sampled pipeline PUI is sufficient to draw the desired conclusion (decision 63 is YES), then the result can be accepted (process 64). The appropriate action to store or log the results of this analysis for this pipeline PUI can then be taken in the usual manner for the particular pipeline system. If, however, the sample coverage for pipeline PUI is not adequate for drawing the desired conclusion (decision 63 is NO), the human analyst can then notify the appropriate personnel to obtain a new set of UT/RT sample measurements from that pipeline (process 66). In this case, the behavior exhibited by pipeline PUI in its UT/RT sample measurements indicate that a higher level of sampling is required, based on the experience gained from ILI measurements on pipelines with similar apparent behavior. Upon receiving the new set of UT/RT measurements at a higher sample coverage, the entire process may then be repeated using the entire new set of UT/RT sample measurements. This is because the additional samples may affect the entire distribution of the UT/RT sample measurements, such that different ILI pipeline distributions may now be most similar to the pipeline PUI; in other words, the additional sample measurements may alter the shape of the distribution, rather than merely add to the existing distribution.

Of course, if the additional sampling of pipeline PUI returns a wall loss measurement that is sufficiently high, corrective action may then be taken to replace some or all of that pipeline at least at the location of that measurement. In this event, the additional sampling required to ensure a statistically valid conclusion regarding the integrity of the pipeline provoked detection of a potential pipeline failure.

Following completion of the process of FIG. 5 for pipeline PUI, additional pipelines for which UT/RT measurements have been obtained, can of course be similarly analyzed.

In addition, as mentioned above, if additional ILI information is obtained for additional pipelines in the overall system, or for pipelines for which ILI information has already been processed and stored in ILI library 20, these new ILI measurement data may be processed as described above and ILI library 20 updated accordingly. The accuracy of this overall process in evaluating sampled pipeline measurements will necessarily improve as the number of pipelines and ILI data sets processed into ILI library 20 increases.

According to an aspect of this invention, some inherent amount of robustness is present when applied to UT/RT sample measurements that are obtained in the usual manner. This is because this process presumes that the UT/RT samples are obtained at random locations along the pipeline. In practice, as known in the art, actual UT/RT monitoring is not performed randomly along the length of the pipeline, but rather the locations at which UT/RT measurements are taken are selected based on corrosion models and inspection experience. As such, actual UT/RT measurements tend to be biased toward higher wall loss locations, which in theory should improve the robustness of the method according to this embodiment of the invention. Inaccuracy of the result because of a skew in the sample distribution is believed to be largely avoided, considering that low wall loss values in the calibrated ILI measurements are discarded in generating the distribution subsets (process 56) according to this embodiment of the invention.

Important benefits in the monitoring of pipeline integrity in a large scale pipeline system can be obtained according to this invention. The operator can obtain a realistic level of confidence from sampled pipeline wall thickness loss measurements through the use of this invention, without relying on unsupportable assumptions about the statistical distribution of wall loss along the pipeline, and without relying on fluid and material models with unrealistic or unsupportable underlying assumptions. By providing a realistic evaluation of the confidence levels for certain conclusions from such monitoring, the operator of the production field or pipeline system can more efficiently perform the necessary monitoring to ensure a suitable level of integrity, by focusing measurement resources where most needed.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of evaluating a sufficiency of a number of measurements of an integrity of a pipeline, comprising:

receiving sampled measurement data of pipeline wall thickness loss for the pipeline, wherein the sampled measurement data was obtained at a plurality of sample locations along an external surface of the pipeline;

identifying a maximum wall thickness loss measurement from the sampled measurement data;

identifying in-line inspection measurement data of pipeline wall thickness loss for a plurality of reference pipeline datasets stored in a data library;

selecting a subset of the in-line inspection measurement data having maximum wall thickness loss measurements that are greater than a first predetermined value when the maximum wall thickness loss measurement from the sampled measurement data is less than the first predetermined value;

calculating differences between a distribution of the sampled measurement data of pipeline wall thickness loss and distributions of the subset of the in-line inspection measurement data of pipeline wall thickness loss;

selecting at least a portion of the in-line inspection measurement data from the subset of the in-line inspection measurement data having distributions similar to the distribution of the sampled measurement data of pipeline wall thickness loss, wherein the similarity is determined by comparing the calculated differences;

retrieving, from the data library, at least a first statistic for the portion of the in-line inspection measurement data, the first statistic indicating a sample coverage required to accept a first premise regarding an extreme value of wall thickness loss for the pipeline to a specified confidence level;

determining, by a computer, from at least the first statistic and the sampled measurement data, a sufficiency of the sampled measurement data to allow a determination of the integrity of the pipeline;

acquiring a new set of sample measurements of pipeline wall thickness loss for the pipeline responsive to the determining indicating that the sampled measurement data is insufficient to allow the determination of the integrity of the pipeline, wherein sample coverage for the new set of sample measurements is greater than sample coverage for the sampled measurement data;

replacing at least a portion of the pipeline responsive to the determining indicating that the sampled measurement data is sufficient to allow the determination of the integrity of the pipeline.

2. The method of claim 1, wherein the first premise is that the extreme value of wall thickness loss for the pipeline does not exceed a first specific percentage.

3. The method of claim 2, wherein a plurality of statistics are retrieved in the retrieving step; and wherein a second statistic indicates the sample coverage required to accept a second premise regarding the extreme value of wall thickness for the pipeline to a specified confidence level, the second premise being that the extreme value of wall thickness loss for the pipeline does not exceed a second specific percentage.

4. The method of claim 1, wherein the first premise is that the maximum wall thickness loss measurement from the sampled measurement data is within a specific percentage of the maximum wall thickness loss in the pipeline.

5. The method of claim 1, wherein the calculating step comprises:

determining populations in a first distribution of the in-line inspection measurement data within a plurality of bins;

determining populations in the distribution of the sampled measurement data within the plurality of bins;

calculating differences between the populations in the first distribution of the in-line inspection measurement data and the corresponding populations in the distribution of the sampled measurement data for each of the plurality of bins;

squaring the differences for each of the plurality of bins;

summing the squared differences; and selecting one or more reference pipeline datasets responsive to the sum of the squared differences.

6. The method of claim 1, wherein the determining step comprises:

comparing a sample coverage of the sampled measurement data for the pipeline to the required sample coverage indicated by the first statistic.

7. The method of claim 1, further comprising:

generating the data library from the in-line inspection measurement data for the plurality of reference pipeline datasets, the data library comprising, for each reference pipeline dataset:

a distribution of the in-line inspection measurement data for the reference pipeline datasets, and one or more statistics comprising at least the first statistic.

8. The method of claim 7, wherein the step of generating the data library comprises, for each of the plurality of reference pipeline datasets:

retrieving the in-line inspection measurement data for the reference pipeline datasets;

generating the distributions of the in-line inspection measurement data for the reference pipeline datasets;

storing the distributions in the data library in association with the reference pipeline datasets;

at a first sample coverage, randomly sampling the in-line inspection measurement data;

repeating the randomly sampling step for a plurality of repetitions at the first sample coverage;

determining a percentage of the plurality of repetitions that the first premise is satisfied by the random sample;

repeating the randomly sampling step, the repeating step, and the determining step for a plurality of sample coverages; and storing, in the data library and in association with the reference pipeline datasets, sample coverage statistics corresponding to the percentages from the repeated determining step.

9. The method of claim 8, wherein the step of generating the data library further comprises:

calibrating the retrieved in-line inspection measurement data according to a calibration function between the in-line inspection measurement data and the sampled measurement data.

10. The method of claim 8, wherein the step of generating the data library further comprises:

calibrating the distribution of the in-line inspection measurement data according to a calibration function between the in-line inspection measurement data and the sampled measurement data.

11. The method of claim 1, further comprising selecting a different subset of the inline inspection measurement data having maximum wall thickness loss measurements that are greater than a second predetermined value when the maximum wall thickness loss measurement from the received sampled measurement data is greater than the second predetermined value, wherein the second predetermined value is greater than the first predetermined value.

12. An evaluation system for evaluating measurements of pipeline wall thicknesses, comprising:

a memory resource for storing a data library;

one or more central processing units for executing program instructions;

and program memory, coupled to the central processing unit, for storing a computer program including program instructions that, when executed by the one or more central processing units, is capable of causing the evaluation system to perform a sequence of operations for evaluating a sufficiency of a number of measurements of an integrity of a pipeline, the sequence of operations comprising:

receiving sampled measurement data of pipeline wall thickness loss for the pipeline, wherein the sampled measurement data was obtained at a plurality of sample locations along an external surface of the pipeline;

identifying a maximum wall thickness loss measurement from the sampled measurement data;

identifying in-line inspection measurement data of pipeline wall thickness loss for a plurality of reference pipeline datasets stored in a data library;

selecting a subset of the in-line inspection measurement data having maximum wall thickness loss measurements that are greater than a first predetermined value when the maximum wall thickness loss measurement from the sampled measurement data is less than the first predetermined value;

calculating differences between a distribution of the sampled measurement data of pipeline wall thickness loss and distributions of the subset of the in-line inspection measurement data of pipeline wall thickness loss;

selecting at least a portion of the in-line inspection measurement data from the subset of the in-line inspection measurement data having distributions similar to the distribution of the sampled measurement data of pipeline wall thickness loss, wherein the similarity is determined by comparing the calculated differences;

retrieving, from the data library, at least a first statistic for the portion of the in-line inspection measurement data, the first statistic indicating a sample coverage required to accept a first premise regarding an extreme value of wall thickness loss for the pipeline to a specified confidence level;

comparing a sample coverage of the sampled measurement data for the pipeline to the required sample coverage indicated by the first statistic to determine a sufficiency of the sampled measurement data to allow a determination of the integrity of the pipeline;

requiring acquisition of a new set of sample measurements of pipeline wall thickness loss for the pipeline responsive to the comparing indicating that the sampled measurement data is insufficient to allow the determination of the integrity of the pipeline, wherein sample coverage for the new set of sample measurements is greater than sample coverage for the sampled measurement data;

replacing at least a portion of the pipeline responsive to the comparing indicating that the sampled measurement data is sufficient to allow the determination of the integrity of the pipeline.

13. The evaluation system of claim 12, further comprising:

a network interface for presenting and receiving communication signals to a network accessible to human users;

wherein the memory resource is accessible to the central processing units via the network interface.

14. The evaluation system of claim 12, wherein the operation of receiving sampled measurement data comprises:

accessing the memory resource.

15. The evaluation system of claim 12, wherein the first premise is that the extreme value of wall thickness loss for the pipeline does not exceed a first specific percentage.

16. The evaluation system of claim 15, wherein a plurality of statistics are retrieved in the retrieving operation;

and wherein a second statistic indicates the sample coverage required to accept a second premise regarding the extreme value of wall thickness for the pipeline to a specified confidence level, the second premise being that the extreme value of wall thickness loss for the pipeline does not exceed a second specific percentage.

17. The evaluation system of claim 12, wherein the first premise is that the maximum wall thickness loss measurement from the sampled measurement data is within a specific percentage of the maximum wall thickness loss in the pipeline.

18. The evaluation system of claim 12, wherein the calculating operation comprises:

determining populations in a first distribution of the in-line inspection measurement data within a plurality of bins;

determining populations in the distributions of the sampled measurement data within the plurality of bins;

calculating differences between the populations in the first distribution of the in-line inspection measurement data and the corresponding populations in the distribution of the sampled measurement data for each of the plurality of bins;

squaring the differences for each of the plurality of bins;

summing the squared differences; and selecting one or more reference pipeline datasets responsive to the sum of the squared differences.

19. A non-transitory computer-readable medium storing a computer program that, when executed on a computer system, causes the computer system to perform a sequence of operations for evaluating a sufficiency of a number of measurements of an integrity of a pipeline, the sequence of operations comprising:

receiving sampled measurement data of pipeline wall thickness loss for the pipeline, wherein the sampled measurement data was obtained at a plurality of sample locations along an external surface of the pipeline;

identifying a maximum wall thickness loss measurement from the sampled measurement identifying in-line inspection measurement data of pipeline wall thickness loss for a plurality of reference pipeline datasets stored in a data library;

selecting a subset of the in-line inspection measurement data having maximum wall thickness loss measurements that are greater than a first predetermined value when the maximum wall thickness loss measurement from the sampled measurement data is less than the first predetermined value;

calculating differences between a distribution of the sampled measurement data of pipeline wall thickness loss and distributions of the subset of the in-line inspection measurement data of pipeline wall thickness loss;

selecting at least a portion of the in-line inspection measurement data from the subset of the in-line inspection measurement data having distributions similar to the distribution of the sampled measurement data of pipeline wall thickness loss, wherein the similarity is determined by comparing the calculated differences;

retrieving, from the data library, at least a first statistic for the portion of the in-line inspection measurement data, the first statistic indicating a sample coverage required to accept a first premise regarding an extreme value of wall thickness loss for the pipeline to a specified confidence level;

determining, from at least the first statistic and the sampled measurement data, a sufficiency of the sampled measurement data to allow a determination of the integrity of the pipeline;

requiring acquisition of a new set of sample measurements of pipeline wall thickness loss for the pipeline responsive to the determining indicating that the sampled measurement data is insufficient to allow the determination of the integrity of the pipeline, wherein sample coverage for the new set of sample measurements is greater than sample coverage for the sampled measurement data;

replacing at least a portion of the pipeline responsive to the comparing indicating that the sampled measurement data is sufficient to allow the determination of the integrity of the pipeline.

20. The non-transitory computer-readable medium of claim 19, wherein the first premise is that the extreme value of wall thickness loss for the pipeline does not exceed a first specific percentage.

21. The non-transitory computer-readable medium of claim 20, wherein a plurality of statistics are retrieved in the retrieving operation;

and wherein a second statistic indicates the sample coverage required to accept a second premise regarding the extreme value of wall thickness for the pipeline to a specified confidence level, the second premise being that the extreme value of wall thickness loss for the pipeline does not exceed a second specific percentage.

22. The non-transitory computer-readable medium of claim 19, wherein the first premise is that the maximum wall thickness loss measurement from the sampled measurement data is within a specific percentage of the maximum wall thickness loss in the pipeline.

23. The non-transitory computer-readable medium of claim 19, wherein the calculating step comprises:

determining populations in a first distribution of the in-line inspection measurement data within a plurality of bins;

determining populations in the distributions of sampled measurement data within the plurality of bins;

calculating differences between the populations in the first distribution of the in-line inspection measurement data and the corresponding populations in the distribution of the sampled measurement data for each of the plurality of bins;

squaring the differences for each of the plurality of bins;

summing the squared differences; and selecting one or more reference pipeline datasets responsive to the sum of the squared differences.

24. The non-transitory computer-readable medium of claim 19, wherein the determining step comprises:

comparing a sample coverage of the sampled measurement data for the pipeline to the required sample coverage indicated by the first statistic.

25. The non-transitory computer-readable medium of claim 19, wherein the sequence of operations further comprises:

generating a data library, for each of the plurality of reference pipeline datasets, by:

retrieving the in-line inspection measurement data for the reference pipeline datasets;

generating the distributions of the in-line inspection measurement data for the reference pipeline datasets;

storing the distributions in the data library III association with the reference pipeline datasets;

at a first sample coverage, randomly sampling the in-line inspection measurement data;

repeating the randomly sampling step for a plurality of repetitions at the first sample coverage;

determining a percentage of the plurality of repetitions that the first premise is satisfied by the random sample;

repeating the randomly sampling step, the repeating step, and the determining step for a plurality of sample coverages; and storing, in the data library and in association with the reference pipeline datasets, sample coverage statistics corresponding to the percentages from the repeated determining step.

26. The non-transitory computer-readable medium of claim 25, wherein the operation of generating the data library further comprises:

calibrating the retrieved in-line inspection measurement data according to a calibration function between the in-line inspection measurement data and the sampled measurement data.

* * * * *